United States Patent
Noguchi et al.

(10) Patent No.: US 11,965,567 B2
(45) Date of Patent: Apr. 23, 2024

(54) DISC BRAKE

(71) Applicant: HITACHI AUTOMOTIVE SYSTEMS, LTD., Ibaraki (JP)

(72) Inventors: Shoichi Noguchi, Kofu (JP); Shigeru Hayashi, Minami Alps (JP); Satoshi Nakamura, Minami Alps (JP); Toshiko Watanabe, Minami Alps (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 588 days.

(21) Appl. No.: 17/057,708

(22) PCT Filed: May 15, 2019

(86) PCT No.: PCT/JP2019/019260
§ 371 (c)(1),
(2) Date: Nov. 23, 2020

(87) PCT Pub. No.: WO2019/230394
PCT Pub. Date: Dec. 5, 2019

(65) Prior Publication Data
US 2021/0199168 A1    Jul. 1, 2021

(30) Foreign Application Priority Data
May 29, 2018 (JP) .................................. 2018-102315

(51) Int. Cl.
*F16D 55/18*   (2006.01)
*F16D 65/18*   (2006.01)
*F16D 125/08*  (2012.01)

(52) U.S. Cl.
CPC ........ *F16D 65/183* (2013.01); *F16D 2125/08* (2013.01)

(58) Field of Classification Search
CPC .......................... F16D 2125/08; F16D 2121/04
See application file for complete search history.

(56) References Cited

U.S. PATENT DOCUMENTS 5,325,940 A * 7/1994 Rueckert ................. F16D 65/18
                                                       277/587
5,826,681 A * 10/1998 Kubo ....................... F16D 65/18
                                                       188/72.4
(Continued)

FOREIGN PATENT DOCUMENTS

DE          3241164 A1    5/1984
GB       2 129 878 A      5/1984
(Continued)

OTHER PUBLICATIONS

International Search Report of PCT/JP2019/019260 dated Aug. 20, 2019.
(Continued)

*Primary Examiner* — Nicholas J Lane
(74) *Attorney, Agent, or Firm* — MATTINGLY & MALUR, PC (57) ABSTRACT

This disc brake includes a cylinder bore into which a piston is fitted, a seal groove provided in the cylinder bore as an annular groove, and a seal member which has a rectangular cross section shape and which is fitted into the seal groove and seal a space between the piston and the cylinder bore. The seal groove includes a bottom surface portion, a side surface portion, and a chamfered portion. The chamfered portion is formed to expand an opening of the seal groove in the axial direction of the cylinder bore and has two types of curvature radii (r1 and r2).

2 Claims, 5 Drawing Sheets

(56) References Cited

U.S. PATENT DOCUMENTS

| | | | |
|---|---|---|---|
| 6,244,393 B1 | 6/2001 | Weidenweber et al. | |
| 8,651,254 B2* | 2/2014 | Watarai | F16J 15/3204 |
| | | | 188/26 |
| 8,794,396 B2* | 8/2014 | Chelaidite | F16D 55/10 |
| | | | 277/455 |
| 2009/0272606 A1* | 11/2009 | Chelaidite | F16D 55/22 |
| | | | 188/72.4 |
| 2010/0194056 A1 | 8/2010 | Nanri et al. | |
| 2011/0240417 A1 | 10/2011 | Kono et al. | |
| 2013/0081910 A1 | 4/2013 | Chelaidite | |
| 2020/0370649 A1* | 11/2020 | Maekawa | F16J 15/06 |
| 2022/0025946 A1* | 1/2022 | Kim | F16J 15/18 |
| 2022/0170546 A1* | 6/2022 | Nakai | B62L 1/005 |

FOREIGN PATENT DOCUMENTS

| | | |
|---|---|---|
| JP | 5-340435 A | 12/1993 |
| JP | 2010-175041 A | 8/2010 |
| JP | 2011-214623 A | 10/2011 |
| JP | 2013-79723 A | 5/2013 |

OTHER PUBLICATIONS

Written Opinion of PCT/JP2019/019260 dated Aug. 20, 2019.
Japanese Office Action received in corresponding Japanese Application No. 2020-521839 dated Mar. 1, 2022.
Indian Office Action received in corresponding Indian Application No. 202017051185 dated May 31, 2021.

* cited by examiner

DISC BRAKE

TECHNICAL FIELD

The present invention relates to a disc brake.

Priority is claimed on Japanese Patent Application No. 2018-102315, filed May 29, 2018, the content of which is incorporated herein by reference.

BACKGROUND ART

There is a disc brake in which a brake fluid pressure is introduced between a cylinder bore and a piston which is slidably fitted into the cylinder bore and a brake pad is pressed against a disc rotor by advancing the piston (refer to, for example, Patent Literature 1 to 3).

CITATION LIST

Patent Literature

[Patent Literature 1]
Japanese Unexamined Patent Application, First Publication No. 2010-175041
[Patent Literature 2]
Japanese Unexamined Patent Application, First Publication No. 2011-214623
[Patent Literature 3]
U.S. Pat. No. 6,244,393

SUMMARY OF INVENTION

Technical Problem

In a disc brake, so-called dragging in which a brake pad is continuously in contact with a disc even after braking is released may occur. Suppression of such dragging is desired.

The present invention provides a disc brake which is capable of suppressing dragging.

Solution to Problem

According to a disc brake of one aspect of the present invention, a seal groove provided in a cylinder bore as an annular groove recessed from an inner peripheral surface includes a bottom surface portion inclined in a direction in which a diameter thereof expands to an opening side of the cylinder bore, a side surface portion which extends from a large diameter side of the bottom surface portion to the opening side of the seal groove, and a chamfered portion provided between the side surface portion and the inner peripheral surface of the cylinder bore and formed to expand an opening of the seal groove in an axial direction of the cylinder bore. The chamfered portion has two types of curvature radii.

Advantageous Effects of Invention

According to the above-described, it is possible to suppress dragging.

DESCRIPTION OF EMBODIMENTS

First Embodiment

Hereinafter, a first embodiment is described with reference to FIGS. 1 to 5.

Figure 1:
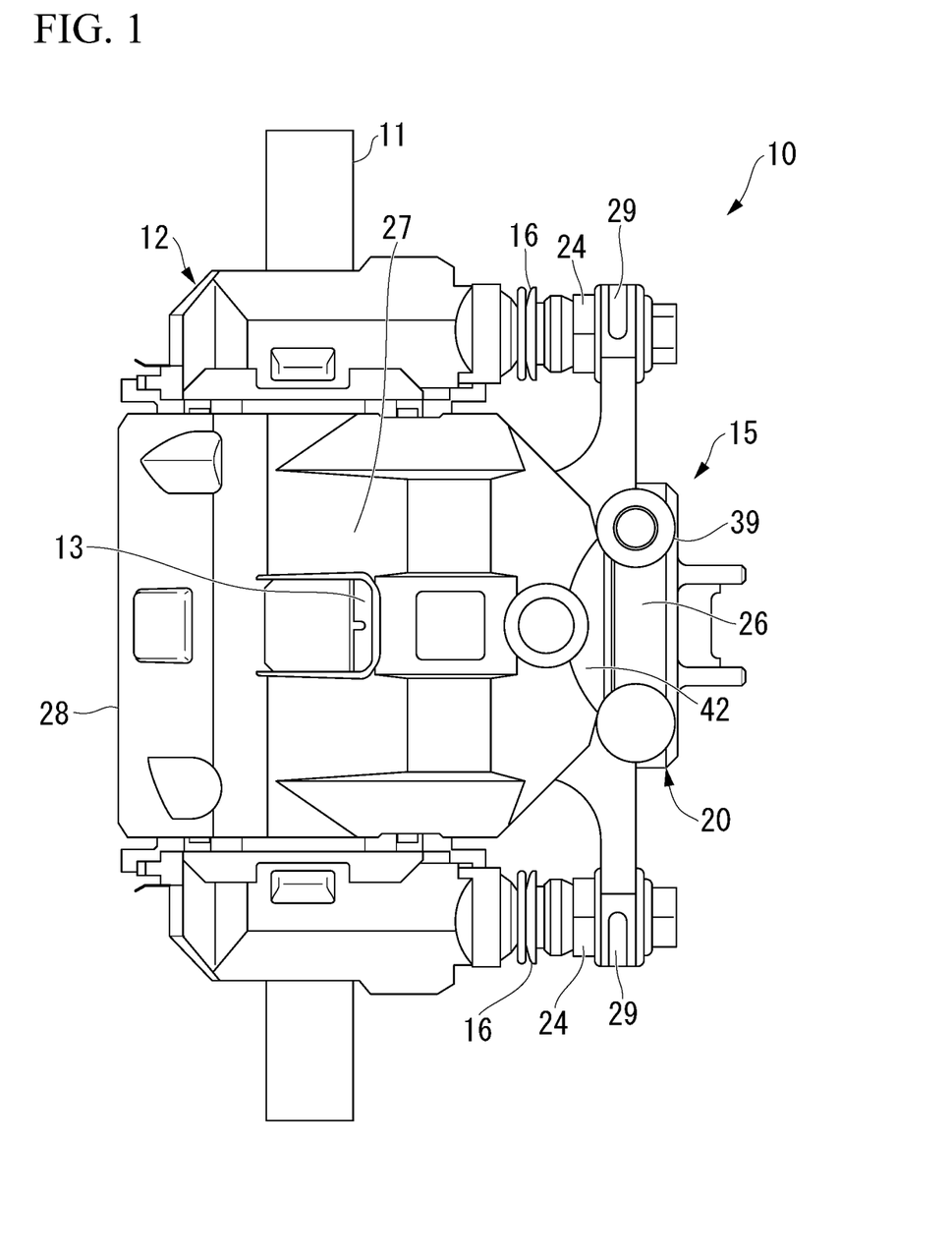
FIG. 1 is a plan view showing a disc brake according to a first embodiment of the present invention.
Figure 2:
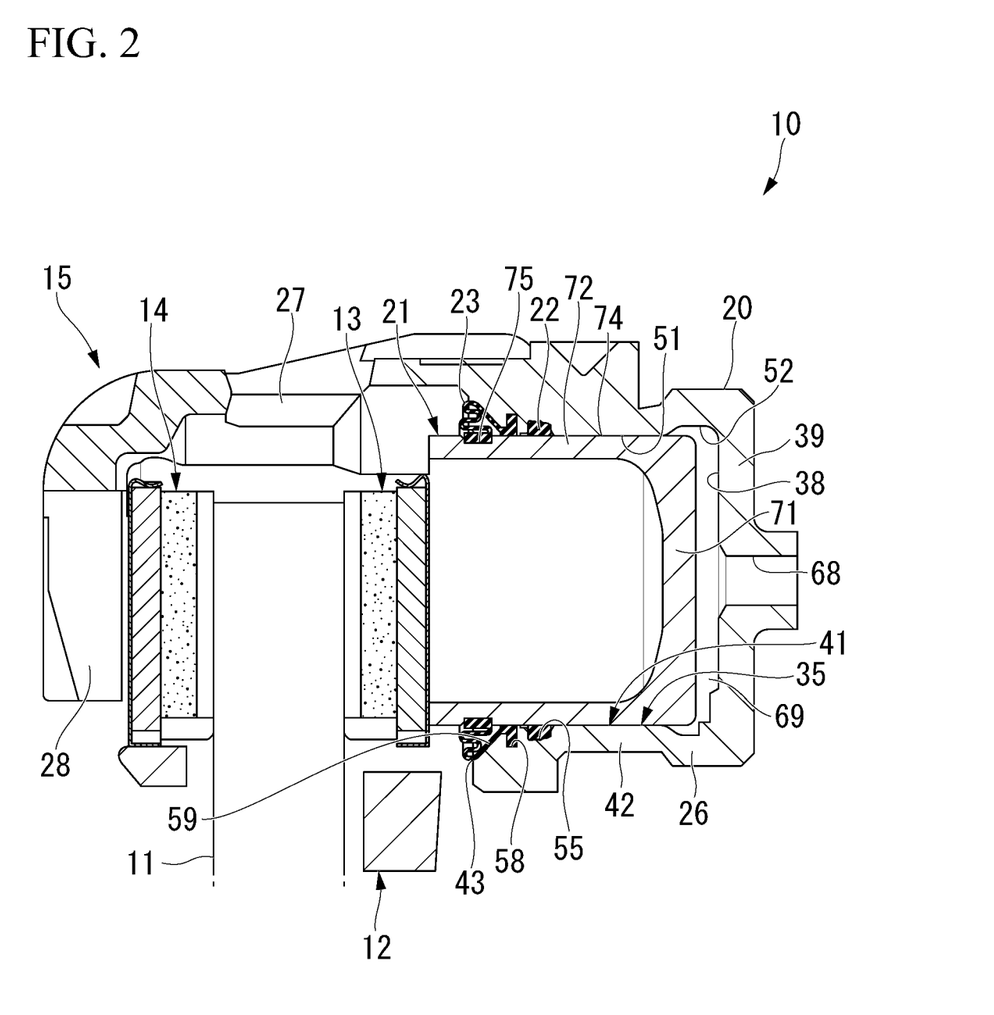
FIG. 2 is a side cross-sectional view showing the disc brake according to the first embodiment of the present invention.

FIGS. 1 and 2 show a disc brake 10 according to the first embodiment. The disc brake 10 provides a braking force for a vehicle such as an automobile. The disc brake 10 is specifically for braking a four-wheeled vehicle. The disc brake 10 brakes the vehicle by stopping rotation of a disc rotor 11 which rotates together with a wheel (not shown). Hereinafter, a direction of a central axis of the disc rotor 11 is referred to as a disc axial direction, a radial direction of the disc rotor 11 is referred to as a disc radial direction, and a circumferential direction (a rotational direction) of a disc is referred to as a disc circumferential direction.

The disc brake 10 includes a carrier 12, a pair of brake pads 13 and 14 shown in FIG. 2, a caliper 15, and a pair of boots 16 shown in FIG. 1. The carrier 12 is disposed to straddle the outer peripheral side of the disc rotor 11 and is fixed to a non-rotating portion of the vehicle. The pair of brake pads 13 and 14 are disposed on both sides of the disc rotor 11 and are supported by the carrier 12 to be movable in the disc axial direction. The caliper 15 is supported by the carrier 12 to be movable in the disc axial direction. The caliper 15 sandwiches the pair of brake pads 13 and 14 and presses them against both surfaces of the disc rotor 11.

The caliper 15 includes a caliper body 20, a piston 21, a seal member 22, a boot member 23, and a pair of slide pins 24 shown in FIG. 1.

The caliper body 20 is formed by machining a metal material integrally molded by casting. The caliper body 20 includes a cylinder 26 disposed on one side of the disc rotor 11 in the disc axial direction, a bridge portion 27 which extend from outside of the cylinder 26 in the disc radial direction to straddle the outer circumference of the disc rotor 11, a claw portion 28 which extends inward in the disc radial direction from the side of the bridge portion 27 opposite to the cylinder 26 and is disposed on the other side of the disc rotor 11 in the disc axial direction, and a pair of arms 29 shown in FIG. 1 which extend from the cylinder 26 on both sides in the disc circumferential direction. The caliper body 20 is movably supported by the carrier 12 with slide pins 24 mounted in the pair of arms 29. The pair of boots 16 covers the slide pins 24.

As shown in FIG. 2, a cylinder bore 35 having a shape in which one end opens toward the claw portion 28 side and is recessed toward the side opposite to the disc rotor 11 in the disc axial direction is formed in the cylinder 26. Since the cylinder bore 35 which opens toward the claw portion 28 side is formed, the cylinder 26 has a cylinder bottom portion 39 including an inner bottom portion 38 of the cylinder bore 35 on the side opposite to the claw portion 28, and also has a cylinder body portion 42 which extends from the cylinder bottom portion 39 to the claw portion 28 side and includes an inner wall portion 41 of the cylinder bore 35. The cylinder bore 35 has an opening 43 on the side of the cylinder body portion 42 opposite to the cylinder bottom portion 39. The cylinder bottom portion 39 side of the cylinder bore 35 is referred to as a bore bottom side, and the opening 43 side of the cylinder bore 35 is referred to as a bore opening side.

The piston 21 is fitted in the cylinder bore 35 to be slidable in the disc axial direction. The inner wall portion 41 of the cylinder bore 35 has a guide inner peripheral surface 51 (an inner peripheral surface) which is a cylindrical surface having a constant inner diameter over the entire length to guide movement of the piston 21. A central axis of the guide inner peripheral surface 51 is a central axis of the cylinder bore 35. This central axis is referred to as a bore axis. Further, a direction orthogonal to the central axis is referred to as a bore radial direction, and a circumferential direction around the central axis is referred to as a bore circumferential direction.

The inner wall portion 41 of the cylinder bore 35 has an annular large-diameter groove 52, which is recessed outward in the bore radial direction with respect to the guide inner peripheral surface 51, on the bore bottom side with respect to the guide inner peripheral surface 51. The large-diameter groove 52 has an annular shape centered on the bore axis, and a groove bottom diameter thereof is larger than a diameter of the guide inner peripheral surface 51.

The inner wall portion 41 of the cylinder bore 35 has an annular seal groove 55 recessed outward in the bore radial direction with respect to the guide inner peripheral surface 51 at an intermediate position of the guide inner peripheral surface 51 on the bore opening side. The seal groove 55 is an annular groove centered on the bore axis which is recessed from the guide inner peripheral surface 51 in the inner wall portion 41 of the cylinder bore 35. The groove bottom diameter of the seal groove 55 is larger than the diameter of the guide inner peripheral surface 51.

In the inner wall portion 41 of the cylinder bore 35, an annular boot fitting groove 58 which is recessed outward in the bore radial direction with respect to the guide inner peripheral surface 51 is formed on the bore opening side with respect to the seal groove 55. The boot fitting groove 58 has an annular shape centered on the bore shaft, and a groove bottom diameter thereof is larger than the diameter of the guide inner peripheral surface 51.

In the inner wall portion 41 of the cylinder bore 35, a boot arrangement hole 59 which has a tapered shape centered on the bore axis and has a larger diameter going away from the boot fitting groove 58 is formed on the bore opening side with respect to the boot fitting groove 58. An end portion of the boot arrangement hole 59 on the side opposite to the cylinder bottom portion 39 serves as the opening 43 of the cylinder bore 35. The large-diameter groove 52 and the inner bottom portion 38 connected to the large-diameter groove 52 are formed by casting when a material of the caliper body 20 is cast. The guide inner peripheral surface 51, the seal groove 55, the boot fitting groove 58, and the boot arrangement hole 59 are formed by machining the material of the caliper body 20.

A pipe hole 68 which passes through the cylinder bottom portion 39 in the bore axial direction is formed in the cylinder bottom portion 39 to open into the cylinder bore 35. The pipe hole 68 is formed by machining the material of the caliper body 20. A brake pipe (not shown) is connected to the pipe hole 68.

The piston 21 includes a disc-shaped piston bottom portion 71 and a cylindrical piston body portion 72. The piston 21 is formed in a bottomed tubular shape in which an end portion of the piston body portion 72 opposite to the piston bottom portion 71 opens. An annular fitting groove 75 which is recessed inward in the radial direction with respect to an outer diameter surface 74 formed of a cylindrical surface is formed in the piston body portion 72 on the side opposite to the piston bottom portion 71 in the axial direction. The piston 21 is accommodated in the cylinder bore 35 so that the piston bottom portion 71 is located on the bore bottom side in the cylinder bore 35, and in this state, a tip end thereof on the claw portion 28 side protrudes to the claw portion 28 side with respect to the cylinder bore 35. In this way, the fitting groove 75 is formed in the piston 21 on the tip end side which protrudes further than the cylinder bore 35.

The seal member 22 is made of an elastic material, specifically a rubber material. The seal member 22 is fitted into the seal groove 55 of the cylinder bore 35 with a tightening margin. The piston 21 is fitted into the inner peripheral side of the seal member 22 with a tightening margin. The seal member 22 elastically deforms in the radial direction and comes into close contact with the piston 21 and the seal groove 55 to seal between the cylinder bore 35 of the cylinder 26 and the piston 21. Further, the seal member 22 supports the outer diameter surface 74 of the piston 21 to be movable in the bore axial direction with the guide inner peripheral surface 51 of the cylinder bore 35. The seal member 22 forms a hydraulic chamber 69 with the cylinder bore 35 and the piston 21. A brake fluid is supplied to and discharged from the hydraulic chamber 69 via a brake pipe connected to the pipe hole 68.

The boot member 23 is a stretchable bellows-shaped tubular body. One end of the boot member 23 is fitted into the boot fitting groove 58 of the cylinder 26, and the other end is fitted into the fitting groove 75 of the piston 21. The boot member 23 covers a portion of the outer diameter surface 74, which is exposed from the cylinder bore 35, on the piston bottom portion 71 side with respect to the fitting groove 75 of the piston 21. The boot member 23 expands and contracts as the piston 21 moves with respect to the cylinder bore 35.

When a brake pedal (not shown) is operated, in the disc brake 10, the brake fluid is introduced into the hydraulic chamber 69 via the brake pipe (not shown) connected to the pipe hole 68. Then, a brake fluid pressure acts on the piston bottom portion 71 of the piston 21 in a direction away from the cylinder bottom portion 39. As a result, the piston 21 advances to the disc rotor 11 side with respect to the cylinder bore 35 and presses the brake pad 13 disposed between the piston 21 and the disc rotor 11 toward the disc rotor 11. Thus, the brake pad 13 moves and comes into contact with the disc rotor 11. When the piston 21 advances to the disc rotor 11 side with respect to the cylinder bore 35 in this way, the piston 21 elastically deforms the inner peripheral side of the seal member 22 so that a contact portion of the seal member 22 accommodated in the seal groove 55 is integrally moved by friction.

Further, due to a reaction force which presses the brake pad 13 against the disc rotor 11, the caliper body 20 slides with respect to the carrier 12 on the pair of slide pins 24, and the claw portion 28 presses the brake pad 14 disposed between the claw portion 28 and the disc rotor 11 toward the disc rotor 11. As a result, the brake pad 14 comes into contact with the disc rotor 11. In this way, the caliper 15 sandwiches the pair of brake pads 13 and 14 from both sides with the piston 21 and the claw portion 28 and presses them against both surfaces of the disc rotor 11 by the operation of the piston 21. As a result, the caliper 15 imparts frictional resistance to the disc rotor 11 to generate the braking force. The piston 21 presses the brake pads 13 and 14 on both sides against the disc rotor 11 by the brake fluid pressure.

From this state, when the brake pedal (not shown) is loosened, a hydraulic pressure in the hydraulic chamber 69 decreases, and a force applied to the seal member 22 elastically deformed as described above by the piston 21 decreases. Then, the seal member 22 returns from the deformed state due to its own elasticity. At that time, a so-called rollback in which the piston 21 is retracted to the bore bottom side by friction occurs and a gap is formed between the piston 21 and the brake pad 13. Then, the brake pads 13 and 14 and the claw portion 28 move in the direction away from the disc rotor 11 in the disc axial direction due to shaking of the disc rotor 11.

Figure 3A:
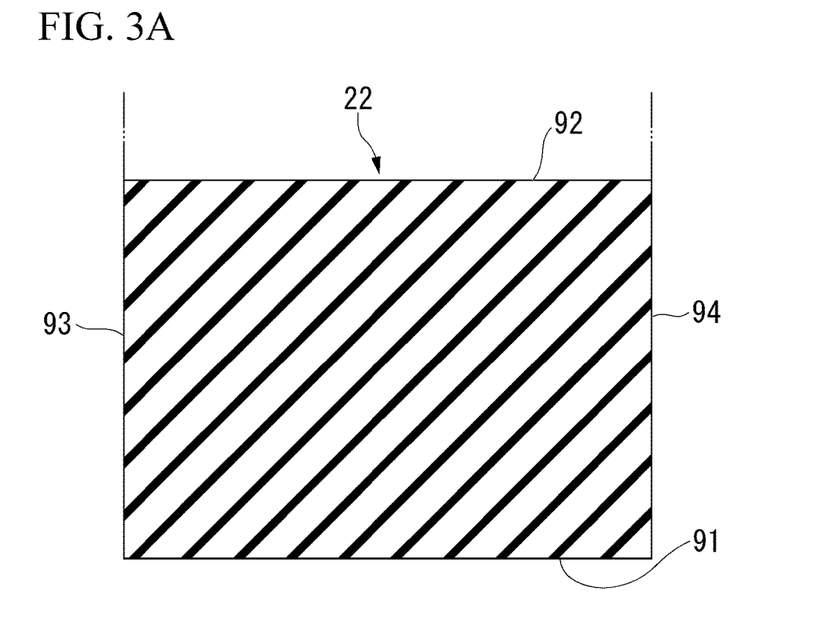
FIG. 3A is a partial cross-sectional view showing a seal member of the disc brake according to the first embodiment of the present invention.

As shown in FIG. 3A, when a shape of the seal member 22 made of an elastic material is formed as a circular shape in a natural state before the seal member 22 is fitted into the seal groove 55, the seal member 22 includes an outer peripheral surface 91 constituted of a cylindrical surface, an inner peripheral surface 92 constituted of a cylindrical surface having a diameter smaller than that of the outer peripheral surface 91, a flat end surface 93 orthogonal to the outer peripheral surface 91 and the inner peripheral surface 92 and connecting one end edge portions of them with each other in the axial direction, and a flat end surface 94 orthogonal to the outer peripheral surface 91 and the inner peripheral surface 92 and connecting the other end edge portions thereof with each other in the axial direction. In other words, when the shape of the seal member 22 is formed as a circular shape in the natural state before the seal member 22 is fitted into the seal groove 55, a cross-sectional shape of the seal member 22 when a cross section thereof is taken from a plane including the central axis is a rectangle having a long side parallel to the central axis.

The seal groove 55 has an annular shape centered on the bore axis, and includes a bore bottom side chamfered portion 101, a bore bottom side lateral face portion 102, a groove bottom surface portion 103 (a bottom surface portion), a bore opening side lateral face portion 104 (a side surface portion), a bore opening side chamfered portion 105 (a chamfered portion), an axial extending surface portion 106, and a radial extending surface portion 107 in order from the bore bottom side (BBS shown in FIG. 3B) in the bore axial direction. The small diameter side of the seal groove 55 serves as a groove opening 108 which opens toward the bore axis.

The bore bottom side chamfered portion 101 is a tapered surface centered on the bore axis which extends outward in the bore radial direction from the guide inner peripheral surface 51, that is a cylindrical surface, and is inclined to be located on the bore opening side (BOS shown in FIG. 3B) as it goes outward in the bore radial direction. The bore bottom side chamfered portion 101 is formed in an annular shape with a constant diameter on the small diameter side and a constant diameter on the large diameter side over the entire circumference in the bore circumferential direction.

Figure 3B:
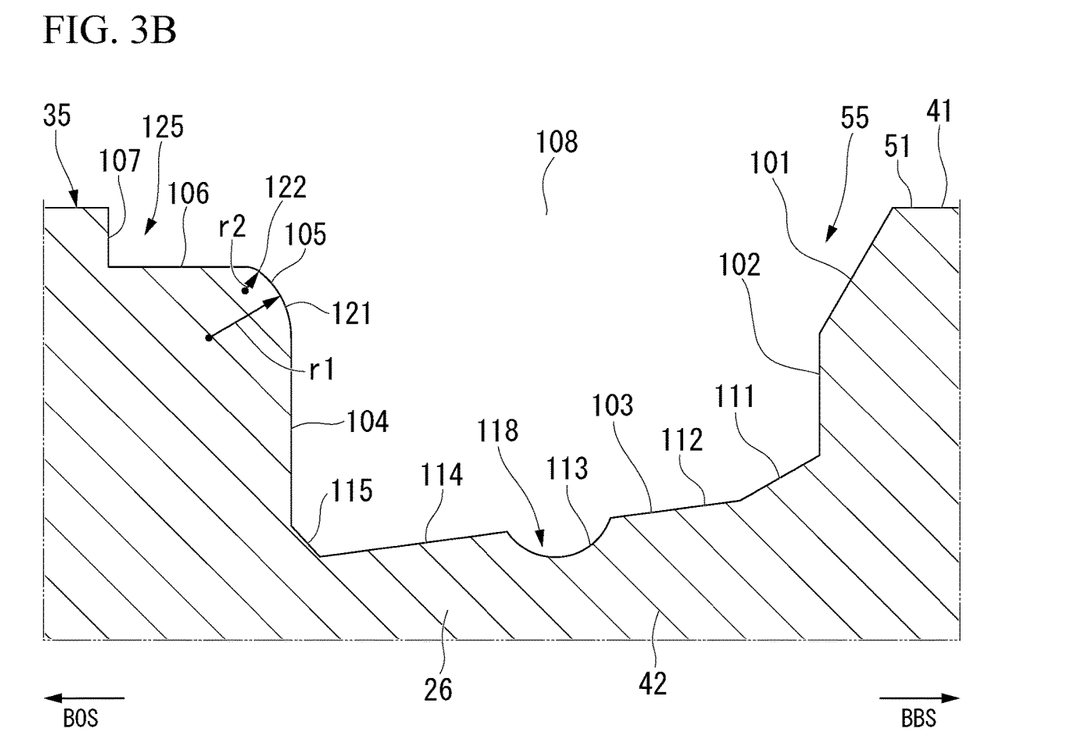
FIG. 3B is a partial cross-sectional view showing a state before a seal groove of the disc brake according to the first embodiment of the present invention is assembled.

The bore bottom side lateral face portion 102 is an annular flat surface centered on the bore axis which extends outward in the bore radial direction from an end edge portion of the bore bottom side chamfered portion 101 on the large diameter side to be perpendicular to the bore axis. The bore bottom side lateral face portion 102 has an annular shape with a constant diameter on the small diameter side and a constant diameter on the large diameter side over the entire circumference in the bore circumferential direction.

The groove bottom surface portion 103 includes a first tapered surface portion 111, a second tapered surface portion 112, a concave surface portion 113, a third tapered surface portion 114, and a fourth tapered surface portion 115 in order from the bore bottom side.

The first tapered surface portion 111 is a tapered surface centered on the bore axis which extends from an end edge portion of the bore bottom side lateral face portion 102 on the large diameter side to the bore opening side and is inclined to be located outward in the bore radial direction as it goes toward the bore opening side. A taper of the first tapered surface portion 111 is smaller than that of the bore bottom side chamfered portion 101. The first tapered surface portion 111 has an annular shape with a constant diameter on the small diameter side and a constant diameter on the large diameter side over the entire circumference in the bore circumferential direction.

The second tapered surface portion 112 is a tapered surface centered on the bore axis which extends from an end edge portion of the first tapered surface portion 111 on the bore opening side to the bore opening side and is inclined to be located outward in the bore radial direction as it goes toward the bore opening side. A taper of the second tapered surface portion 112 is smaller than that of the first tapered surface portion 111. The second tapered surface portion 112 has an annular shape with a constant diameter on the small diameter side and a constant diameter on the large diameter side over the entire circumference in the bore circumferential direction.

The concave surface portion 113 is a curved surface which extends from an end edge portion of the second tapered surface portion 112 on the bore opening side to the bore opening side and is inclined to be located outward in the bore radial direction as it goes toward the bore opening side, and thereafter is inclined to be located inward in the bore radial direction as it goes toward the bore opening side. The concave surface portion 113 has an annular shape centered on the bore axis.

The concave surface portion 113 has an arc shape of which a cross section in a plane including the bore axis has a center inside in the bore radial direction. In the concave surface portion 113, the cross section has a constant shape over the entire circumference in the bore circumferential direction.

The third tapered surface portion 114 is a tapered surface centered on the bore axis which extends from an end edge portion of the concave surface portion 113 on the bore opening side to the bore opening side and is inclined to be located outward in the bore radial direction as it goes toward the bore opening side. The third tapered surface portion 114 has the same taper as the second tapered surface portion 112, and is disposed on the same tapered surface as the second tapered surface portion 112. The third tapered surface portion 114 has an annular shape with a constant diameter on the small diameter side and a constant diameter on the large diameter side over the entire circumference in the bore circumferential direction. The concave surface portion 113 is recessed outward in the bore radial direction with respect to the second tapered surface portion 112 and the third tapered surface portion 114 disposed on the same tapered surface, and constitutes an annular bottom groove 118 formed in the groove bottom surface portion 103 of the seal groove 55.

The fourth tapered surface portion 115 is a tapered surface centered on the bore axis which extends from an end edge portion of the third tapered surface portion 114 on the bore opening side to the bore opening side and is inclined to be located inward in the bore radial direction as it goes toward the bore opening side. The fourth tapered surface portion 115 has an annular shape with a constant diameter on the large diameter side and a constant diameter on the small diameter side over the entire circumference in the bore circumferential direction.

The groove bottom surface portion 103 having the first tapered surface portion 111, the second tapered surface portion 112, the concave surface portion 113, the third tapered surface portion 114, and the fourth tapered surface portion 115 is inclined as a whole in a direction in which a diameter thereof expands toward the bore opening side. The first tapered surface portion 111 side thereof in the bore axial direction is the small diameter side, and the fourth tapered surface portion 115 side thereof is the large diameter side.

The bore opening side lateral face portion 104 is an annular flat surface centered on the bore axis which extends inward in the bore radial direction from an end edge portion of the fourth tapered surface portion 115 on the bore opening side to be orthogonal to the bore axis. In other words, the bore opening side lateral face portion 104 extends from the large diameter side of the groove bottom surface portion 103 to the groove opening 108 side of the seal groove 55. The bore opening side lateral face portion 104 has an annular shape with a constant diameter on the large diameter side and a constant diameter on the small diameter side over the entire circumference in the bore circumferential direction.

The bore opening side surface portion 105 is provided between the bore opening side lateral face portion 104 and a portion of the guide inner peripheral surface 51 on the bore opening side with respect to the seal groove 55. The bore opening side chamfered portion 105 is a curved surface which extends inward in the bore radial direction from the end edge portion of the bore opening side lateral face portion 104 on the small diameter side and is inclined to be located on the bore opening side as it goes inward in the bore radial direction. The bore opening side chamfered portion 105 is an annular shape centered on the bore axis. In other words, the bore opening side chamfered portion 105 is formed to expand the groove opening 108 of the seal groove 55 from the end edge portion of the bore opening side lateral face portion 104 on the small diameter side toward the bore axis. The bore opening side chamfered portion 105 has an annular shape with a constant diameter on the large diameter side and a constant diameter on the small diameter side over the entire circumference in the bore circumferential direction. A width of the bore opening side chamfered portion 105 in the bore radial direction is smaller than that of the bore opening side lateral face portion 104.

The bore opening side chamfered portion 105 is a curved surface having two types of curvature radii. That is, the bore opening side chamfered portion 105 includes a first curvature radius portion 121 constituted of a curved surface formed on the groove bottom surface portion 103 side of the seal groove 55, and a second curvature radius portion 122 constituted of a curved surface formed on the guide inner peripheral surface 51 side of the cylinder bore 35 with respect to the first curvature radius portion 121.

The first curvature radius portion 121 is a curved surface which extends inward in the bore radial direction from the end edge portion of the bore opening side lateral face portion 104 on the small diameter side and is inclined to be located on the bore opening side as it goes inward in the bore radial direction. The first curvature radius portion 121 has an annular shape centered on the bore axis. The first curvature radius portion 121 has an arc shape having a constant curvature radius r1 in which a cross section thereof in a plane including the bore axis has a center on the solid portion side of the cylinder 26 forming the first curvature radius portion 121. In the cross section of the first curvature radius portion 121 in the plane including the bore axis, the center of the curvature radius r1 is disposed inward in the bore radial direction with respect to a bisector of an angle formed by the bore opening side lateral face portion 104 and the axial extending surface portion 106. In other words, the first curvature radius portion 121 is inclined at an angle closer to the bore radial direction than the bore axial direction. The cross section of the first curvature radius portion 121 has a constant shape over the entire circumference in the bore circumferential direction.

The first curvature radius portion 121 has an annular shape with a constant diameter on the large diameter side and a constant diameter on the small diameter side over the entire circumference in the bore circumferential direction.

The second curvature radius portion 122 is a curved surface which extends inward in the bore radial direction from an end edge portion of the first curvature radius portion 121 on the small diameter side and is inclined to be located on the bore opening side as it goes inward in the bore radial direction. The second curvature radius portion 122 has an annular shape centered on the bore axis. The second curvature radius portion 122 has an arc shape having a constant curvature radius r2 in which a cross section thereof in a plane including the bore axis has a center on the solid portion side of the cylinder 26 forming the second curvature radius portion 122. The cross section of the second curvature radius portion 122 has a constant shape over the entire circumference in the bore circumferential direction. The second curvature radius portion 122 has an annular shape with a constant diameter on the large diameter side and a constant diameter on the small diameter side over the entire circumference in the bore circumferential direction. The curvature radius r2 of the second curvature radius portion 122 is smaller than the curvature radius r1 of the first curvature radius portion 121. In other words, the second curvature radius portion 122 has a smaller curvature radius than the first curvature radius portion 121. Further, a width of the second curvature radius portion 122 in the bore radial direction is smaller than that of the first curvature radius portion 121.

The axial extending surface portion 106 is a cylindrical surface centered on the bore axis which extends from an end edge portion of the bore opening side chamfered portion 105 on the small diameter side of the second curvature radius portion 122 to the bore opening side. An inner diameter of the axial extending surface portion 106 has a constant diameter over the entire length and is larger than an inner diameter of the guide inner peripheral surface 51.

The radial extending surface portion 107 is an annular flat surface centered on the bore axis which extends inward in the bore radial direction from an end edge portion of the axial extending surface portion 106 on the bore opening side to be perpendicular to the bore axis. The radial extending surface portion 107 has an annular shape with a constant diameter on the small diameter side and a constant diameter on the large diameter side over the entire circumference in the bore circumferential direction. The small diameter side of the radial extending surface portion 107 is connected to a portion of the guide inner peripheral surface 51 on the bore opening side with respect to the seal groove 55.

The axial extending surface portion 106 and the radial extending surface portion 107 constitute a stepped portion 125 having a stepped shape to be recessed outward in the bore radial direction at an end portion of the seal groove 55 on the bore opening side and the groove opening 108 side. In other words, the seal groove 55 has a stepped portion 125 having a stepped shape to be recessed outward in the bore radial direction at the end portion thereof on the bore opening side and the groove opening 108 side.

In the disc brakes described in Patent Literature 1 to 3 described above, a brake fluid pressure is introduced between the cylinder bore and the piston slidably fitted into the cylinder bore to advance the piston and to press the brake pad against the disc rotor. In such a disc brake, a seal member for sealing a gap between the cylinder bore and the piston is provided. The seal member performs a roll back in which the piston is returned to the bottom side of the cylinder when the brake fluid pressure is released.

Incidentally, in order to improve fuel efficiency, it is desired to suppress so-called dragging in which the brake pad is continuously in contact with the disc even after the braking is released. In particular, in the case in which the brake fluid pressure is high, an effect of suppressing the dragging can be obtained by increasing an amount of return of the piston when the hydraulic pressure is released by the seal member. However, if the amount of return of the piston when the hydraulic pressure is released by the seal member is increased, resistance of the seal member to movement of the piston when the brake fluid pressure is low increases, responsiveness of the piston decreases, and a pedal feeling is deteriorated.

On the other hand, in the disc brake 10 according to the first embodiment, the seal groove 55 includes the groove bottom surface portion 103 inclined in a direction in which the diameter of the seal groove 55 expands toward the bore opening side, the bore opening side lateral face 104 which extends from the large diameter side of the groove bottom surface portion 103 to the groove opening 108 side of the seal groove 55, and the bore opening side chamfered portion 105 provided between the bore opening side lateral face portion 104 and the guide inner peripheral surface 51 of the cylinder bore 35 and formed to expand the groove opening 108 in the bore axial direction. The bore opening side chamfered portion 105 has two types of curvature radii r1 and r2.

Specifically, the bore opening side chamfered portion 105 includes the first curvature radius portion 121 having the curvature radius r1 on the groove bottom surface portion 103 side, and the second curvature radius portion 122 formed on the guide inner peripheral surface 51 side with respect to the first curvature radius portion 121 and having the curvature radius r2 smaller than that of the first curvature radius portion 121.

Thus, in the seal member 22 of which the inner peripheral surface 92 side which is the contact side with respect to the piston 21 and moves together with the piston 21 when the piston 21 advances, when the brake fluid pressure is low, the end surface 93 on the bore opening side is deformed with the large curvature radius r1 along the first curvature radius portion 121, and a fulcrum of the deformation gradually changes and the deformation smoothly increases in a state in which a spring constant is low. On the other hand, when the brake fluid pressure is high, the end surface 93 is deformed with the small curvature radius r2 along the second curvature radius portion 122 following the first curvature radius portion 121, and a fulcrum of the deformation gradually changes and the deformation smoothly increases in a state in which a spring constant is high.

Accordingly, an effect of suppressing the dragging is obtained by increasing the amount of return of the piston 21 when the hydraulic pressure is released by the seal member 22 when the brake fluid pressure is high without lowering the responsiveness of the piston 21 when the brake fluid pressure is low. In addition, since the bore opening side chamfered portion 105 is a curved surface, it is possible to reduce a load applied to the seal member 22 when it is deformed, and it is possible to improve durability of the seal member 22.

Further, the first curvature radius portion 121 having the curvature radius r1 larger than that of the second curvature radius portion 122 is provided on the groove bottom surface portion 103 side with respect to the second curvature radius portion 122 having the curvature radius r2. In the cross section of the first curvature radius portion 121 in the plane including the bore axis, the center of curvature radius r1 is disposed inward in the bore radial direction with respect to the bisector of the angle formed by the bore opening side lateral face portion 104 and the axial extending surface portion 106. Therefore, a position of an outer portion of the bore opening side chamfered portion 105 in the bore radial direction can be moved to the bore bottom side. Thus, a bending space of the seal member 22 can be narrowed when the brake fluid pressure is low, the seal member 22 is compressed by the brake fluid pressure, and thus the roll back can be assisted.

Further, a stress distribution for restoration of the seal member 22 can be made uniform by optimizing a boundary position between the first curvature radius portion 121 which is the fulcrum of the deformation of the seal member 22 and the bore opening side lateral face portion 104.

Further, since the stepped portion 125 is provided on the bore opening side and the groove opening 108 side of the seal groove 55, when the inner peripheral surface 92 side of the seal member 22 is deformed to move to the bore opening side together with the piston 21, the seal member 22 is allow to be deformed to a portion of a gap between the stepped portion 125 and the piston 21 beyond the second curvature radius portion 122 and can be greatly deformed.

Figure 4A:
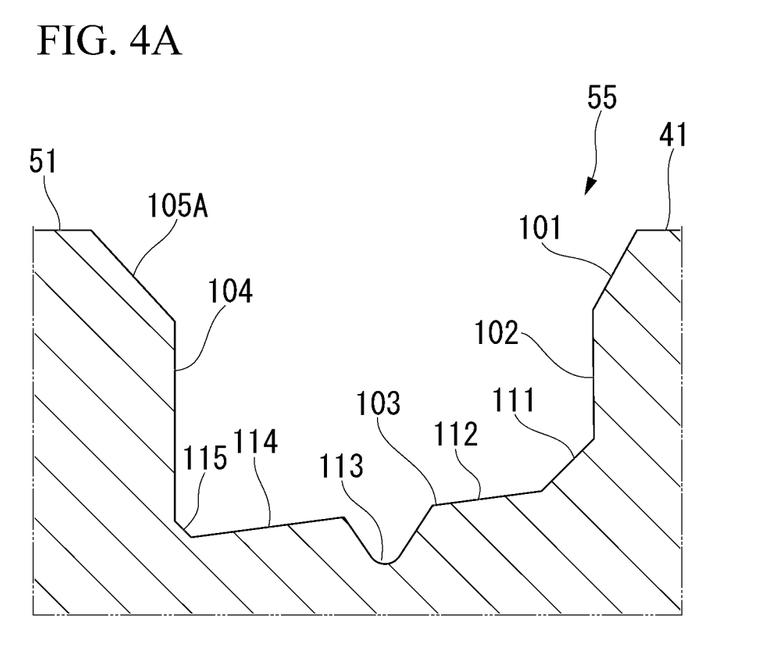
FIG. 4A is a partial cross-sectional view showing a seal groove according to Comparative example 1 of the disc brake.
Figure 4B:
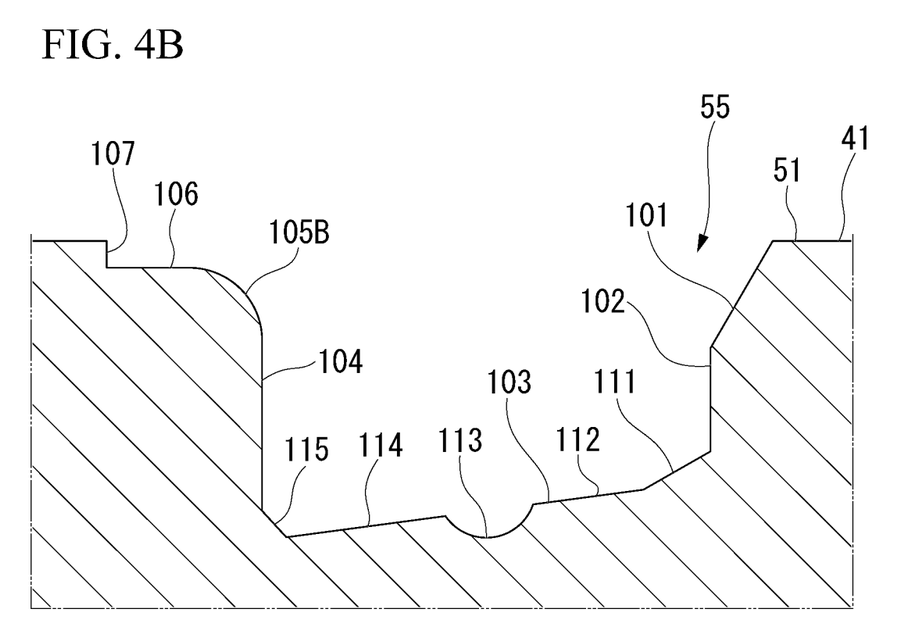
FIG. 4B is a partial cross-sectional view showing a seal groove according to Comparative example 2 of the disc brake.
Figure 5:
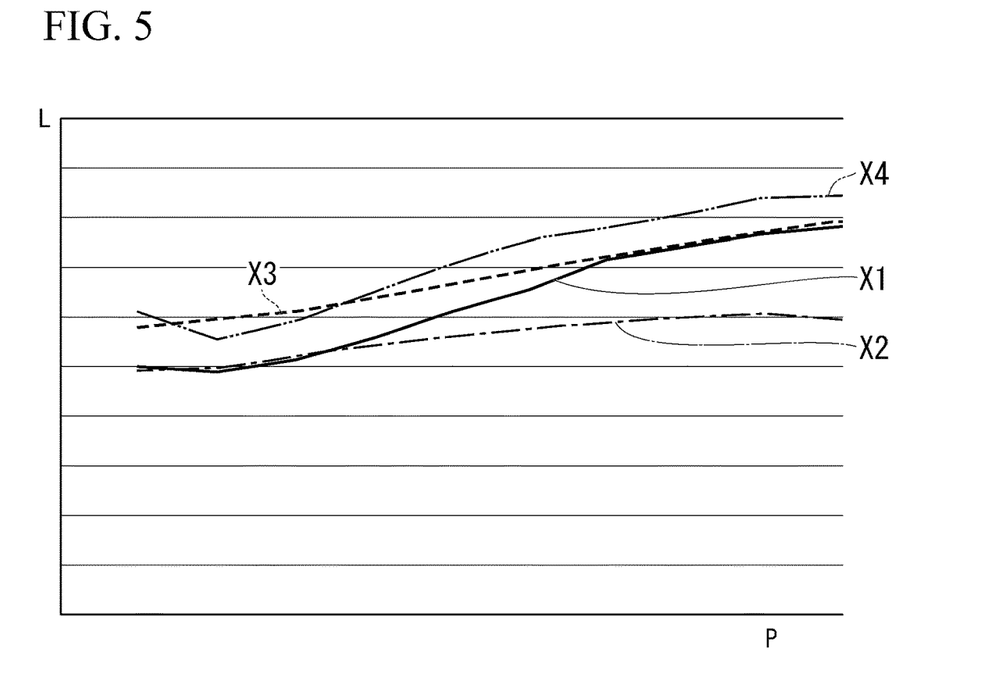
FIG. 5 is a characteristics diagram showing an amount of return of a piston with respect to a brake fluid pressure in the first embodiment and a second embodiment of the present invention and Comparative examples 1 and 2.

Here, as shown in the disc brake 10 of the first embodiment and FIG. 4A as Comparative example 1, for a disc brake having the same configuration as the conventional one in which the seal groove 55 has a bore opening side chamfered portion 105A having a single tapered surface and a disc brake in which the seal groove 55 has a single bore opening side chamfered portion 105B having a constant curvature radius as shown in FIG. 4B, the amount of return of the piston 21 with respect to the brake fluid pressure (hereinafter, referred to as a piston return amount) when the hydraulic pressure was released was experimentally examined. The results are shown in FIG. 5. In a graph of FIG. 5, a horizontal axis is the brake fluid pressure P, a vertical axis is the piston return amount L, and the measurement results of the first embodiment and Comparative Examples 1 and 2 are represented by polygonal lines.

As shown by a solid line X1 in FIG. 5, the disc brake 10 according to the first embodiment can increase the piston return amount higher than that of Comparative Example 1 when the brake fluid pressure is high while the piston return amount is kept low when the brake fluid pressure is low as in the same manner with Comparative Example 1 of the conventional structure shown by an alternate long and short dash line X2 in FIG. 5. In other words, the disc brake 10 of the first embodiment can increase an increase rate of the piston return amount with respect to a unit increase of the brake fluid pressure, as compared with Comparative Example 1 of the conventional structure.

Here, in Comparative Example 2 shown by the broken line X3 in FIG. 5, although the piston return amount when the brake fluid pressure is high can be increased as compared with Comparative Example 1 of the conventional structure, and the effect of suppressing the dragging can be obtained, the piston return amount also increases when the brake fluid pressure is low, the resistance of the seal member to the movement of the piston increases, and thus the responsiveness of the piston decreases.

As described above, the disc brake 10 of the first embodiment can obtain the effect of suppressing the dragging by increasing the return amount of the piston 21 due to the seal member 22 when the brake fluid pressure is high without lowering the responsiveness of the piston 21 when the brake fluid pressure is low.

Second Embodiment

Next, a second embodiment will be described mainly based on FIGS. 5 and 6, focusing on differences from the first embodiment. The parts common to those in the first embodiment are represented by the same names and the same reference numerals.

Figure 6:
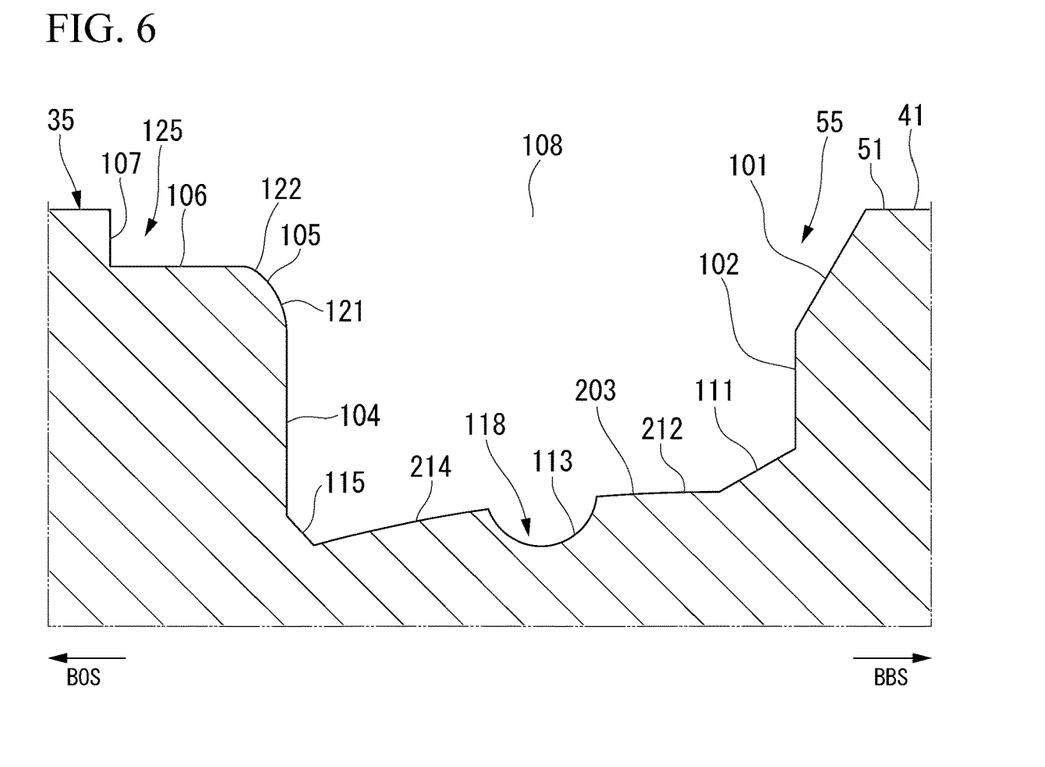
FIG. 6 is a partial cross-sectional view showing a seal groove of a disc brake according to a second embodiment of the present invention.

As shown in FIG. 6, in the second embodiment, the seal groove 55 includes a bore bottom side chamfered portion 101, a bore bottom side lateral face portion 102, a bore opening side lateral face portion 104, a bore opening side chamfered portion 105, an axial extending surface portion 106, and a radial extending surface portion 107 which are the same as in the first embodiment. A groove bottom surface portion 203 (a bottom surface portion) which is partially different from the groove bottom surface portion 103 of the first embodiment is provided between the bore bottom side lateral face portion 102 and the bore opening side lateral face portion 104.

The groove bottom surface portion 203 includes a first tapered surface portion 111, a concave surface portion 113, and a fourth tapered surface portion 115 which are the same as in the first embodiment, includes a first curved surface portion 212 (a first curved surface) different from the second tapered surface portion 112 of the first embodiment between the first tapered surface portion 111 and the concave surface portion 113, and includes a second curved surface portion 214 (a second curved surface portion) different from the third tapered surface portion 114 of the first embodiment between the concave surface portion 113 and the fourth tapered surface portion 115.

The first curved surface portion 212 is a curved surface having an annular shape centered on the bore axis which extends from an end edge portion of the first tapered surface portion 111 on the bore opening side (BOS shown in FIG. 6) to the bore opening side and is inclined to be located outward in the bore radial direction as it goes to the bore opening side. The first curved surface portion 212 has an arc shape of which a cross section in a plane including the bore axis has a center on the outer side in the bore radial direction. The first curved surface portion 212 is largely separated inward from the tapered surface, which connects the end edge portion of the first tapered surface portion 111 on the bore opening side with the end edge portion of the fourth tapered surface portion 115 on the bore bottom side, in the bore radial direction as it goes to the bore opening side in the bore axial direction. The first curved surface portion 212 has an annular shape with a constant diameter on the small diameter side and a constant diameter on the large diameter side over the entire circumference in the bore circumferential direction.

The second curved surface portion 214 is arranged on the bore opening side with respect to the first curved surface portion 212. The second curved surface portion 214 is a curved surface having an annular shape centered on the bore axis which extends from an end edge portion of the concave surface portion 113 on the bore opening side to the bore opening side and is inclined to be located outward in the bore radial direction as it goes to the bore opening side. The second curved surface portion 214 has an arc shape of which a cross section in a plane including the bore axis has a center on the outer side in the bore radial direction. The cross section of the second curved surface portion 214 is disposed in the same arc as that of the same cross section of the first curved surface portion 212. The second curved surface portion 214 is largely separated inward from the tapered surface, which connects the end edge portion of the first tapered surface portion 111 on the bore opening side with the end edge portion of the fourth tapered surface portion 115 on the bore bottom side (BBS shown in FIG. 6), in the bore radial direction as it goes to the bore bottom side in the bore axial direction. The second curved surface portion 214 has an annular shape with a constant diameter on the small diameter side and a constant diameter on the large diameter side over the entire circumference in the bore circumferential direction.

A diameter of each of the first curved surface portion 212 and the second curved surface portion 214 is reduced toward the bore bottom side in the bore axial direction, and a reduction rate of the diameter of the first curved surface portion 212 is smaller than that of the second curved surface portion 214, and the diameter thereof is gradually reduced. In other words, the diameter of each of the first curved surface portion 212 and the second curved surface portion 214 expands toward the bore opening side in the bore axial direction. An expansion rate of the diameter of the first curved surface portion 212 is smaller than that of the second curved surface portion 214, and the diameter thereof gradually expands.

Each of the first curved surface portion 212 and the second curved surface portion 214 has a convex R shape which bulges inward in the radial direction as compared with the tapered surface which connects the end edge portion of the first tapered surface portion 111 on the bore opening side with the end edge portion of the fourth tapered surface portion 115 on the bore bottom side. An annular concave surface portion 113 which is recessed outward in the bore radial direction, that is, an annular bottom groove 118 is formed between the first curved surface portion 212 and the second curved surface portion 214. The groove bottom surface portion 203 includes the first curved surface portion 212 of which a diameter expands to be located outward in the bore radial direction as it goes to the bore opening side, and the second curved surface portion 214 which is disposed on the bore opening side with respect to the first curved surface portion 212, has a diameter expanding to be located on the outer side in the bore radial direction as it goes to the bore opening side and has a larger expansion rate of the diameter than the first curved surface portion 212.

According to the second embodiment, since the groove bottom surface portion 203 has a shape which bulges inward in the bore radial direction, bending of the seal member 22 is less likely to be hindered by the movement of the seal member 22 within a clearance in the bore axial direction. Further, since the tightening margin of the seal member 22 is increased due to the bulging shape of the groove bottom surface portion 203, the amount of return of the piston 21 when the hydraulic pressure is released can be increased.

According to the second embodiment, as shown by an alternate long and short dash line X4 in FIG. 5, the piston return amount can be increased over a range from a low pressure to a high pressure while an increase rate of the piston return amount with respect to the unit increase of the hydraulic pressure is kept substantially the same as that in the first embodiment.

Here, in the disc brake 10 of the embodiment, since the caliper 15 is a floating type which is capable of moving in the disc axial direction with respect to the disc rotor 11, the piston 21 disposed on one side of the disc rotor 11 acts to press the brake pads 13 and 14 on both sides against the disc rotor 11. On the other hand, when the caliper is a fixed type caliper which cannot move in the disc axial direction with respect to the disc rotor, the piston presses only one brake pad located between the piston and the disc rotor.

The above-described shape of the seal groove 55 can be applied to such a fixed type caliper. That is, the above-described shape of the seal groove 55 can be applied to a disc brake having a piston for pressing at least one brake pad against the disc rotor.

Further, although the example in which, when the shape of the seal member 22 is arranged to a circular shape in the natural state, the cross-sectional shape thereof when the cross section is taken from the plane including the central axis is a rectangle having a long side parallel to the central axis has been described, the cross-sectional shape when the cross section is the plane including the central axis may be a square having two sides parallel to the central axis. That is, the seal member 22 may have a rectangular cross-sectional shape when the cross section is taken from the plane including the central axis.

According to a first aspect of the disc brake of the above-described embodiment, the disc brake includes brake pads disposed on both sides of a disc rotor, a piston configured to press at least one of the brake pads on at least one side against the disc rotor, a cylinder bore into which the piston is slidably fitted, a seal groove provided in the cylinder bore as an annular groove recessed from an inner peripheral surface, and a seal member having a rectangular cross sectional shape which is fitted into the seal groove and seals a space between the piston and the cylinder bore. The seal groove includes a bottom surface portion inclined in a direction in which a diameter thereof expands to the opening side of the cylinder bore, a side surface portion which extends from the large diameter side of the bottom surface portion to the opening side of the seal groove, and a chamfered portion provided between the side surface portion and the inner peripheral surface of the cylinder bore and formed to expand an opening of the seal groove in an axial direction of the cylinder bore. The chamfered portion is characterized by having two types of curvature radii. Thus, it is possible to suppress dragging.

Further, according to a second aspect, in the first aspect, the chamfered portion includes a first curvature radius portion formed on the bottom surface portion side of the seal groove, and a second curvature radius portion having a curvature radius smaller than that of the first curvature radius portion and formed on the inner peripheral surface side of the cylinder bore with respect to the first curvature radius portion.

Further, according to a third aspect, in the first or second aspect, the bottom surface portion includes a first curved surface of which a diameter expands to be located outward in a radial direction of the cylinder bore as it goes to the opening side of the cylinder bore, and a second curved surface disposed on the opening side of the cylinder bore with respect to the first curved surface and having a larger expansion rate of a diameter than that of the first curved surface.

INDUSTRIAL APPLICABILITY

According to the above-described disc brake, it is possible to suppress dragging.

REFERENCE SIGNS LIST

10 Disc brake
11 Disc rotor
13, 14 Brake pad
21 Piston
22 Seal member
35 Cylinder bore
51 Guide inner peripheral surface (inner peripheral surface)
55 Seal groove
60 Opening (opening of cylinder bore)
103, 203 Groove bottom surface portion (bottom surface portion)
104 Bore opening side lateral face portion (side surface portion)
105 Bore opening side chamfered portion (chamfered portion)
108 Groove opening (opening of seal groove)
121 First curvature radius portion
122 Second curvature radius portion
212 First curved surface portion (first curved surface)
214 Second curved surface portion (second curved surface)
r1, r2 Curvature radius

The invention claimed is:
1. A disc brake comprising:
brake pads disposed on both sides of a disc rotor;
a piston which presses at least one of the brake pads on at least one side against the disc rotor;
a cylinder having a cylinder bore into which the piston is slidably fitted;
a seal groove provided in the cylinder bore as an annular groove recessed from an inner peripheral surface; and
a seal member having a rectangular cross sectional shape which is fitted into the seal groove and seals a space between the piston and the cylinder bore,
wherein the seal groove includes:
a bottom surface portion inclined in a direction in which a diameter thereof expands to an opening side of the cylinder bore,
a side surface portion which extends from a large diameter side of the bottom surface portion to the opening side of the seal groove, and
a chamfered portion provided between the side surface portion and the inner peripheral surface of the cylinder bore and formed to expand an opening of the seal groove in an axial direction of the cylinder bore, wherein the chamfered portion has a first curvature radius portion having a first curvature radius and a second curvature radius portion having a second curvature radius, the first curvature radius being different from the second curvature radius in a cross section including a bore axis of the cylinder bore, wherein both the first curvature radius and the second curvature radius have a center on a solid portion side of the cylinder in the cross section, and wherein the bottom surface portion includes a first curved surface of which a diameter expands to be located outward in a radial direction of the cylinder bore as it goes to the opening side of the cylinder bore, and a second curved surface disposed on the opening side of the cylinder bore with respect to the first curved surface and having a larger expansion rate of a diameter than that of the first curved surface.

2. The disc brake according to claim 1, wherein the chamfered portion includes:

the first curvature radius portion formed on a bottom surface portion side of the seal groove, and the second curvature radius portion having the second curvature radius smaller than the first curvature radius of the first curvature radius portion and formed on an inner peripheral surface side of the cylinder bore with respect to the first curvature radius portion.

\* \* \* \* \*